(12) United States Patent
Graewe et al.

(10) Patent No.: US 8,071,669 B2
(45) Date of Patent: Dec. 6, 2011

(54) USE OF SILICON OXIDE COMPOUNDS AS FREE-FLOW AGENTS IN THE PRODUCTION OF SOLID POLYVINYL ACETATE RESINS

(75) Inventors: Rene Graewe, Burghausen (DE); Marcus Biber, Burgkirchen (DE); Thomas Wimmer, Burghausen (DE)

(73) Assignee: Wacker Chemie AG, Munich (DE)

( * ) Notice: Subject to any disclaimer, the term of this patent is extended or adjusted under 35 U.S.C. 154(b) by 1128 days.

(21) Appl. No.: 11/817,442

(22) PCT Filed: Mar. 2, 2006

(86) PCT No.: PCT/EP2006/001909
§ 371 (c)(1),
(2), (4) Date: Aug. 30, 2007

(87) PCT Pub. No.: WO2006/092299
PCT Pub. Date: Sep. 8, 2006

(65) Prior Publication Data
US 2009/0238916 A1 Sep. 24, 2009

(30) Foreign Application Priority Data

Mar. 3, 2005 (DE) .......................... 10 2005 009 782

(51) Int. Cl.
*C08K 3/34* (2006.01)
(52) U.S. Cl. ...................... 524/451; 524/442
(58) Field of Classification Search ...... 426/6; 524/442, 524/451
See application file for complete search history.

(56) References Cited

U.S. PATENT DOCUMENTS

| | | | |
|---|---|---|---|
| 2,085,490 A * | 6/1937 | Blaikie | 426/6 |
| 3,053,820 A * | 9/1962 | Wechsler et al. | 526/199 |
| 3,092,600 A * | 6/1963 | Ozawa et al. | 524/432 |
| 3,287,290 A * | 11/1966 | Bray, Jr | 524/46 |
| 5,118,751 A | 6/1992 | Schulze et al. | |
| 5,171,777 A | 12/1992 | Kuphal et al. | |
| 5,319,027 A | 6/1994 | Bott et al. | |
| 5,424,080 A | 6/1995 | Synosky et al. | |
| 5,547,796 A | 8/1996 | Kohtaki et al. | |
| 5,567,750 A | 10/1996 | Schulze et al. | |
| 5,777,015 A | 7/1998 | Jakob et al. | |
| 5,959,017 A | 9/1999 | Eck et al. | |
| 6,559,259 B2 * | 5/2003 | Kohlhammer et al. | 526/287 |
| 6,872,773 B2 | 3/2005 | Pakusch et al. | |
| 7,211,615 B2 | 5/2007 | Baumann et | |
| 2003/0236336 A1 * | 12/2003 | Weiler | 524/423 |
| 2007/0037925 A1 | 2/2007 | Weitzel et al. | |

FOREIGN PATENT DOCUMENTS

| | | |
|---|---|---|
| CA | 2206812 C | 7/1996 |
| DE | 17 19 317 | 3/1972 |
| DE | 0 153 377 | 1/1982 |
| DE | 0153377 | 1/1982 |
| DE | 40 30 638 A1 | 4/1992 |
| DE | 195 35 833 A1 | 3/1997 |
| DE | 195 45 608 A1 | 6/1997 |
| DE | 197 32 333 A1 | 2/1999 |
| DE | 102 51 790 A1 | 5/2004 |
| DE | 103 17 882 A1 | 11/2004 |
| DE | 103 17 882 A1 | 11/2004 |
| GB | 1 206 501 | 9/1970 |
| JP | 4-309549 A | 11/1992 |
| JP | 5-132626 A | 5/1993 |
| JP | 6-313981 A | 11/1994 |
| JP | 9-111093 A | 4/1997 |
| JP | 10-512747 A | 12/1998 |
| KR | 0185574 A | 3/1999 |

OTHER PUBLICATIONS

US 2007/0037925 A1 is corresponding to DE 103 17 882 A1.
Patbase abstract is corresponding to DE 197 32 333 A1.
US 5,777,015 is corresponding to DE 195 45 608 A1.
US 7,211,615 B2 is corresponding to DE 102 51 790 A1.
GB 1 206 501 is corresponding to DE 17 19 317.
US 5,118,751 is corresponding to DE 40 30 638 Al.
US 5,959,017 is corresponding to DE 195 35 833 Al.
Derwent abstract is corresponding to DD 0 153 377.
English Abstract corresponding to KR 0185574, (1999).
Patbase abstract is corresponding to DE 197 32 333 A1, (1999).
Derwent abstract is corresponding to DE 0 153 377, (2005).
US 2007/0037925 A1 is corresponding to DE 103 17 882 A1, (2004).
US 5,777,015 is corresponding to DE 195 45 608 A1, (1997).
US 7,211,615 B2 is corresponding to DE 102 51 790 A1, (2004).
GB 1 206 501 is corresponding to DE 17 19 317, (1972).
US 5,118,751 is corresponding to DE 40 30 638, A1, (1992).
US 5,959,017 is corresponding to DE 195 35 833 A1, (1997).
Derwent abstract is corresponding to DD 0 153 377, (2005).

* cited by examiner

*Primary Examiner* — David W Wu
*Assistant Examiner* — Marie Reddick
(74) *Attorney, Agent, or Firm* — Brooks Kushman P.C.

(57) ABSTRACT

Polyvinyl acetate polymers produced by mass polymerization or suspension polymerization are stabilized against blocking by addition of minor amounts of a silicon oxide compound during the pelletization process of mass polymerized polymers and prior to or during fluidized bed drying in the case of suspension polymerized polymers. The free flowing polymers are suitable for use as chewing gum bases, and for other uses.

11 Claims, No Drawings

USE OF SILICON OXIDE COMPOUNDS AS FREE-FLOW AGENTS IN THE PRODUCTION OF SOLID POLYVINYL ACETATE RESINS

CROSS-REFERENCE TO RELATED APPLICATION

This application is the U.S. national phase of PCT Appln. No. PCT/EP2006/001909 filed Mar. 2, 2006 which claims priority to German application DE 10 2005 009 782.0 filed Mar. 3, 2005.

BACKGROUND OF THE INVENTION

1. Field of the Invention

The invention relates to the use of silicon oxide compounds as free-flow agents in the production of solid polyvinyl acetate resins.

2. Description of the Related Art

In this application, solid resins are understood as meaning vinyl acetate polymers which are present in solid form and are produced by means of mass polymerization or suspension polymerization. The solid polyvinyl acetate resins obtainable by means of mass polymerization are used in particular in the production of chewing gum material, while the solid polyvinyl acetate resins produced by means of suspension polymerization are used for the production of moldings, adhesives and finishes and as low-profile additives.

A disadvantage is that the solid polyvinyl acetate resins generally present in the form of pellets or as powder tend to agglomerate owing to their relatively low glass transition temperature Tg or their surface tack and buildup of electrical charge, which complicates the use of solid polyvinyl acetate resins as raw materials for further processing. The storage limit of solid polyvinyl acetate resins is therefore reached at a temperature as low as about 25° C.

It is known from the area of polymer powders redispersible in water that their flow behavior can be improved by addition of anticaking agents. Redispersible polymer powders, for example based on polyvinyl acetate, are obtained by polymerization in an aqueous medium, and the polymer dispersion obtained thereby is dried after addition of water-soluble protective colloid, usually polyvinyl alcohol. The polymer particles are therefore present with a relatively "hard" protective colloid covering, which firstly ensures the redispersibility in water. It also prevents caking, so that such powders can remain stable during storage up to temperatures of 60° C. DE 197 32 333 A1 recommends a mixture of hydrophilic and hydrophobic silicic acid as an anticaking agent for redispersible polymer powders. DE 195 45 608 A1 and DE 103 17 882 A1 recommend a multiplicity of anticaking agents for redispersible polymer powders, such as carbonates, talc, gypsum, silicic acid, kaolins, hydrophobically modified silicic acid and hydrophobically modified silicon oxide.

DE 102 51 790 A1 shows that relatively hydrophilic solid resins, such as polyamides, show no agglomeration with silicic acid which has been rendered hydrophobic, whereas lumpy powder is obtained with hydrophilic silicic acid.

SUMMARY OF THE INVENTION

It was the object to modify solid polyvinyl acetate resins so that these disadvantages are overcome. The invention thus relates to the use of hydrophilic silicon oxide compounds from the group consisting of talc and pyrogenic silicic acid as free-flow agents in the production of solid polyvinyl acetate resins.

DETAILED DESCRIPTION OF THE PREFERRED EMBODIMENT

Hydrophilic silicon oxide compounds are understood as meaning compounds which exhibit a more hydrophilic character than purely oxidic compounds, such as, for example, corundum. Suitable silicon oxide compounds are talc and pyrogenic silicic acid. The silicon oxide compounds are used in an amount of from 0.01 to 5.0% by weight, preferably from 0.01 to 0.5% by weight, based in each case on the solid resin.

The solid polyvinyl acetate resins can be produced in a known manner by the mass polymerization process. In this process, no solvent is added to the melt in order to reduce the viscosity. Regulators which serve for adjusting the molecular weight are used. Usually, these may be acetone, isopropanol or acetaldehyde.

After the polymerization, the product obtained as a melt is cooled over cooling belts or under water and then shaped into pellets or pastilles, usually having a diameter of from 3 to 4 mm. After the pelletization, the silicon oxide compound is preferably metered into the pellet stream, for example via a metering disk. In the mass polymerization, relatively low molecular weight solid polyvinyl acetate resins having a weight average molecular weight Mw of, preferably, from 10,000 to 20,000 are obtained.

Preferably, talc is added as a free-flow agent to the solid polyvinyl acetate resins obtained by means of mass polymerization.

The solid polyvinyl acetate resins can also be produced by means of suspension polymerization in an aqueous medium. By the addition of a suitable protective colloid, for example polyvinyl alcohol, polyvinylpyrrolidone, or cellulose, and hydrophilic fillers, such as $CaCO_3$, the monomer droplets are stabilized and are polymerized as a whole. The drop size can be adjusted and is usually of the order of magnitude of less than 3 mm, the preferred range being from 0.2 to 2 mm and the best range from 0.5 to 1.5 mm.

The polyvinyl acetate particles dispersed in water are then centrifuged, and the polymer obtained thereby and still containing about 10% by weight of residual water is dried, preferably by means of fluidized-bed drying, to give a powder. Most preferably, the drying is carried out with a hairdryer. In the suspension polymerization, the silicon oxide compound is mixed with the water-containing centrifugate prior to the drying thereof. In the suspension polymerization, relatively high molecular weight solid polyvinyl acetate resins having a weight average molecular weight Mw of, preferably, from 100,000 to 500,000 are obtained.

Preferably, pyrogenic silicic acid is added as a free-flow agent to the solid polyvinyl acetate resins obtained by means of suspension polymerization.

The following examples serve for further explanation of the invention:

Example 1

Two solid polyvinyl acetate resins, which were each produced by the mass polymerization process, were tested: Vinnapas B 1.5 sp having a molecular weight Mw of about 10,000 and Vinnapas B 5 sp having a molecular weight Mw of about 20,000. In the case of both solid resins, 0.1% by weight of talc, based in each case on the weight of the solid resin, was metered in during the pelletization. For comparison, the two solid resins were pelletized without addition of talc.

The tendency to blocking was tested as follows:
in each case 100 g of the solid resins were introduced into 10 cm×10 cm polyethylene bags and the bags were welded.

Thereafter, the bags were stored at 30° C. for 5 hours and loaded in each case with a 5 kg weight.

The tendency to blocking was assessed qualitatively and rated according to the following rating system: 1=no blocking to 6=pronounced blocking.

The results are summarized in table 1:

|  | Sample | | | |
| --- | --- | --- | --- | --- |
|  | B 1.5 sp. without talc | B 1.5 sp. with talc | B 5 sp. without talc | B 5 sp. with talc |
| Block rating | 5 | 2 | 4 | 1 |

It was thus found that even very small amounts of talc are a very positive influence on the storage behavior of low molecular weight solid resins. The tendency to blocking is dramatically reduced even on storage at above room temperature.

Comparative Example 1

The procedure was as in example 1, except that 0.1% by weight of kaolin was metered in during the pelletization. For comparison, the two solid resins were also pelletized without addition of free-flow agent.

The results are summarized in table 2:

|  | Sample | | | |
| --- | --- | --- | --- | --- |
|  | B 1.5 sp. without free-flow agent | B 1.5 sp. kaolin | B 5 sp. without free-flow agent | B 5 sp. kaolin |
| Block rating | 5 | 5 | 4 | 4 |

It was found that no improvement in the tendency to blocking is achievable even with relatively hydrophilic free-flow agents, such as kaolin (aluminum silicate), which does not belong to the group consisting of silicic acid and talc (magnesium silicate).

Example 2

Two solid polyvinyl acetate resins, which in each case were produced by the suspension polymerization process, were tested: Vinnapas UW 1 having a molecular weight Mw of about 100,000 and Vinnapas UW 10 having a molecular weight Mw of about 350,000. In the case of both solid resins, 0.2% by weight of pyrogenic silicic acid (Wacker HDK V15), based in each case on the weight of the solid resin, was metered in after the centrifuging and before the fluidized-bed drying. For comparison, the two solid resins were also dried without addition of pyrogenic silicic acid.

In the fluidized-bed drying with a hairdryer, it was found that, in the case of the suspension polymers modified with pyrogenic silicic acid, the drying performance can be increased from 200 kg/h to 300 to 600 kg/h.

The tendency to blocking was tested as follows:

In each case 100 g of the solid resins were introduced into a 10 cm×10 cm polyethylene bag and the bags were welded. Thereafter, the bags were stored at 50° C. for 5 hours and loaded in each case with a 5 kg weight.

The tendency to blocking was assessed qualitatively and rated according to the following rating system: 1=no blocking to 6=pronounced blocking.

The results are summarized in table 3:

|  | Sample | | | |
| --- | --- | --- | --- | --- |
|  | UW 1 without HDK | UW 1 with HDK | UW10 without HDK | UW10 with HDK |
| Block rating | 5 | 2 | 4 | 1 |

It was thus found that even very small amounts of pyrogenic silicic acid have a very positive influence on the storage behavior of the solid resins. The tendency to blocking is dramatically reduced even on storage at substantially above room temperature.

Comparative Example 2

The procedure was as in example 1, except that 0.1% by weight of hydrophobic silicic acid (Aerosil$^R$ R 812)) was metered in during the pelletization. For comparison, the two solid resins were also pelletized without addition of free-flow agent.

The results are summarized in table 4.

|  | Sample | | | |
| --- | --- | --- | --- | --- |
|  | B 1.5 sp. without free-flow agent | B 1.5 sp. hydrophobia silicic acid | B 5 sp. without free-flow agent | B 5 sp. hydrophobic silicic acid |
| Block rating | 5 | 4 | 4 | 3 |

The results show that the storage behavior of solid polyvinyl acetate resins is scarcely improved with hydrophobic silicic acid.

The invention claimed is:

1. A process for the preparation of free flowing polyvinyl acetate resins resistant to blocking, comprising
    preparing a polyvinyl acetate resin by mass polymerization or suspension polymerization, and adding thereto at least one silicon oxide compound selected from the group consisting of talc and pyrogenic silicic acid as a free-flow agent, wherein
    a) talc is used as a free-flow agent for solid polyvinyl acetate resins obtained by means of mass polymerization and the free-flow agent is added during a pelletization process of the solid resin, or
    b) pyrogenic silicic acid is used as a free-flow agent for solid polyvinyl acetate resins obtained by means of suspension polymerization, and the free-flow agent is added before fluidized-bed drying a suspension containing the solid resin.

2. The process of claim 1, wherein the silicon oxide compound(s) are used in an amount of from 0.01 to 5.0% by weight, based on the solid resin.

3. The process of claim 1, wherein the silicon oxide compound(s) are used in an amount of from 0.01 to 0.5% by weight, based on the solid resin.

4. The process of claim 1, wherein the solid polyvinyl acetate resin is obtained by mass polymerization, and talc is used as a free-flow agent added during a pelletization process.

5. The process of claim 4, wherein the silicon oxide compound(s) are used in an amount of from 0.01 to 5.0% by weight, based on the solid resin.

6. The process of claim 4, wherein the silicon oxide compound(s) are used in an amount of from 0.01 to 0.5% by weight, based on the solid resin.

7. The process of claim 1, wherein the solid polyvinyl acetate resin is obtained by means of suspension polymerization, and the pyrogenic silicic acid is added as a free-flow agent before fluidized-bed drying.

8. The process of claim 7, wherein the silicon oxide compound(s) are used in an amount of from 0.01 to 5.0% by weight, based on the solid resin.

9. The process of claim 7, wherein the silicon oxide compound(s) are used in an amount of from 0.01 to 0.5% by weight, based on the solid resin.

10. The process of claim 1, wherein the polyvinyl acetate resin is obtained by mass polymerization and formed into pellets or pastilles having diameters of from 3 mm to 4 mm.

11. The process of claim 1, wherein the polyvinyl acetate resin is obtained by suspension polymerization and dried, and particles of the dried resin have diameters of from 0.2 mm to 2 mm.

* * * * *